United States Patent
McNeilly (10) Patent No.: US 9,518,882 B2
(45) Date of Patent: Dec. 13, 2016

(54) OPTICAL MULTI-AXIS FORCE SENSOR

(71) Applicant: The Cleveland Electric Laboratories Company, Twinsburg, OH (US)

(72) Inventor: Mike McNeilly, Gilbert, AZ (US)

( * ) Notice: Subject to any disclaimer, the term of this patent is extended or adjusted under 35 U.S.C. 154(b) by 189 days.

(21) Appl. No.: 14/323,287

(22) Filed: Jul. 3, 2014

(65) Prior Publication Data
US 2015/0330847 A1   Nov. 19, 2015

Related U.S. Application Data

(60) Provisional application No. 61/842,804, filed on Jul. 3, 2013.

(51) Int. Cl.
| | |
|---|---|
| G01B 11/16 | (2006.01) |
| G01L 1/24 | (2006.01) |
| G01B 5/30 | (2006.01) |
| G01B 7/16 | (2006.01) |
| G01L 1/00 | (2006.01) |
| G01N 3/00 | (2006.01) |
| G01L 5/16 | (2006.01) |
| G01L 5/22 | (2006.01) |
| G01L 1/22 | (2006.01) |

(52) U.S. Cl.
CPC ............. *G01L 5/166* (2013.01); *G01L 1/2281* (2013.01); *G01L 1/246* (2013.01); *G01L 5/223* (2013.01)

(58) Field of Classification Search
None
See application file for complete search history.

(56) References Cited

U.S. PATENT DOCUMENTS

| | | | |
|---|---|---|---|
| 4,138,884 A | 2/1979 | Ruoff, Jr. et al. | |
| 4,488,441 A | 12/1984 | Ramming | |
| 5,429,007 A * | 7/1995 | Khachaturian | G01L 5/101 73/862.392 |
| 6,073,496 A * | 6/2000 | Kuhn | B66C 1/40 73/862.56 |
| 6,354,152 B1 * | 3/2002 | Herlik | G01N 29/223 73/597 |
| 6,367,335 B1 * | 4/2002 | Hicks | G01L 1/246 250/227.14 |
| 6,834,552 B1 * | 12/2004 | Thorsen | G01L 1/24 73/800 |
| 7,646,945 B2 * | 1/2010 | Jones | E21B 17/01 385/12 |
| 7,701,586 B2 * | 4/2010 | Otugen | G01L 1/243 356/35.5 |

(Continued)

Primary Examiner — Andre Allen
Assistant Examiner — Jermaine Jenkins
(74) Attorney, Agent, or Firm — Roger D. Emerson; Emerson Thomson Bennett, LLC (57) ABSTRACT

A force sensor includes a rigid loaded member including a flat plate having a first major side, a second major side opposite the first major side, and a center; wherein the first major side and the second major side are substantially parallel to each other and to a plane including orthogonal X and Y axes, and are substantially perpendicular to the Z axis; at least two optical strain sensors directly secured to at least one of the first major side and the second major side; and an attachment means secured to the first major side substantially at the center; wherein the loaded member is configured to be securable to an associated supporting surface such that the second major side faces the associated supporting surface.

20 Claims, 9 Drawing Sheets

(56) References Cited

U.S. PATENT DOCUMENTS

| | | | |
|---|---|---|---|
| 7,720,324 B2* | 5/2010 | Haase | G01L 1/246 |
| | | | 385/13 |
| 7,743,672 B2 | 6/2010 | Kurtz et al. | |
| 8,276,461 B2 | 10/2012 | Zwygart | |
| 8,701,500 B2* | 4/2014 | Swinehart | G02B 6/02209 |
| | | | 73/800 |
| 8,780,335 B2* | 7/2014 | Van Steenberge | G01L 1/24 |
| | | | 356/32 |
| 2002/0154860 A1 | 10/2002 | Fernald et al. | |
| 2004/0114850 A1 | 6/2004 | Dewyntermarty et al. | |
| 2005/0169568 A1 | 8/2005 | Shang et al. | |
| 2007/0193362 A1 | 8/2007 | Ferguson | |
| 2011/0107842 A1* | 5/2011 | Dargahi | G01N 3/40 |
| | | | 73/780 |
| 2012/0132008 A1 | 5/2012 | Way et al. | |
| 2013/0239701 A1 | 9/2013 | Huang | |

\* cited by examiner

OPTICAL MULTI-AXIS FORCE SENSOR

I. BACKGROUND

This invention pertains to the art of optical multi-axis force sensors. Force sensors or load sensors are used to measure an applied force. Multi-axis force sensors are used to measure the magnitude and direction of forces that are applied three-dimensionally.

II. SUMMARY

In accordance with one aspect of the present invention, a force sensor includes: a rigid loaded member including: a flat plate having a first major side, a second major side opposite the first major side, and a center; wherein the first major side and the second major side are substantially parallel to each other and to a plane including orthogonal X and Y axes, and are substantially perpendicular to the Z axis; at least two optical strain sensors directly secured to at least one of the first major side and the second major side; and an attachment means secured to the first major side substantially at the center; wherein the loaded member is configured to be securable to an associated supporting surface such that the second major side faces the associated supporting surface.

In accordance with another aspect of the present invention, a force sensor includes: a rigid loaded member including: a substantially cylindrical column including: a primary axis substantially parallel to a Z axis and substantially perpendicular to a plane including orthogonal X and Y axes; a continuous circumferential outer surface substantially parallel to the Z axis; and two substantially parallel bases at first and second ends of the column, wherein the bases are substantially perpendicular to the Z axis; and at least two optical strain sensors directly secured to the outer surface of the column; wherein the loaded member is configured to be securable to an associated supporting surface such that the first end of the column faces away from the associated supporting surface; and wherein the first end of the column is configured for application of a force to the first end.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
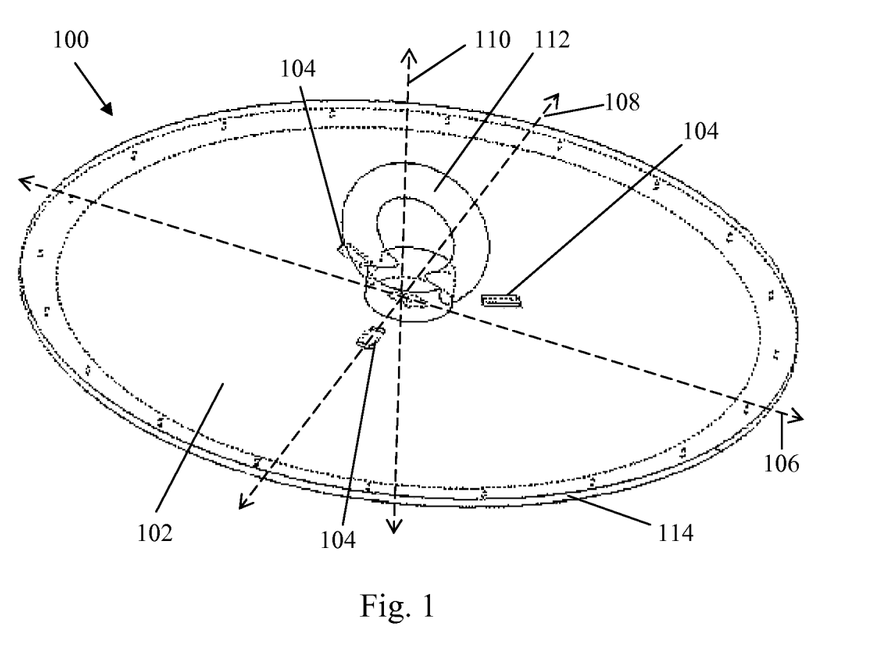
FIG. 1 is a perspective view of a force sensor according to one embodiment.

Referring now to the drawings wherein the showings are for purposes of illustrating embodiments of the invention only and not for purposes of limiting the same, and wherein like reference numerals are understood to refer to like components, FIG. 1 shows a force sensor 100 according to one embodiment. The force sensor 100 may include a loaded member 102 or a stressed member, which may be substantially in the shape of a flat plate in one embodiment. The loaded member 102 may include two major sides, opposite each other. FIG. 1 shows three orthogonal reference axes for the loaded member 102. The X axis 106 and the Y axis 108 may lie in a plane parallel to the major sides of the loaded member 102. The Z axis 110 may be orthogonal to the plane containing the X and Y axes 106, 108. The three axes 106, 108, 110 may intersect at a reference center of the loaded member 102.

The loaded member 102 may be shaped, sized, and made from a rigid material that allows small movements (micro-movements) but is not resilient. Alternative embodiments may have the loaded member 102 made from steel, aluminum, plastic, composite materials, combinations of these materials, or other materials. The shape of the loaded member 102 may be elliptical (as shown in FIG. 1), circular, rectangular, square, or any other desired shape in alternative embodiments.

Three strain sensors 104 may be secured to one side of the loaded member 102. In alternative embodiments, some strain sensors 104 may be secured to one major side of the loaded member 102 and some strain sensors 104 may be secured to the other major side of the loaded member 102. In one embodiment, the strain sensors 104 may be secured equidistant from the center of the loaded member 102 with respect to the X and Y axes 106, 108. In alternative embodiments, the strain sensors 104 may be secured at varying distances from the center of the loaded member 102. In one embodiment, the strain sensors 104 may be oriented radially from the center of the loaded member 102. In alternative embodiments, the strain sensors 104 may be at varying orientations with respect to the center of the loaded member 102. In one embodiment, the strain sensors 104 may be equally spaced from each other. In alternative embodiments, the strain sensors 104 may be spaced such that some strain sensors 104 are positioned closer together and others 104 are positioned further apart from each other. These alternative positions may be used with any force sensor embodiments disclosed in this specification.

The strain sensors 104 may be connected to a detector (not shown) that reads the strain of each strain sensor 104. Based on the combination of strains measured by each strain sensor 104, the force sensor 100 may calculate the overall force that is applied to the force sensor 100.

The strain sensors 104 may be optical sensors that sense compressive and tensile strain applied to them 104. An optical fiber (not shown) may be secured from each strain sensor 104 to the detector. In one embodiment, the strain sensors 104 may be fiber optic sensors. In one embodiment, the strain sensors 104 may be Fiber Bragg Grating (FBG) sensors. In another embodiment, the strain sensors 104 may be Fabry-Perot strain sensors. In another embodiment the strain sensors 104 may use fiber optic interferometry methods to determine the level of strain in the optical fiber.

An attachment means, including, but not limited to, a hook 112, a loop, an eyelet, a protrusion or column with a threaded opening, and a protrusion with tabs, may be secured to the loaded member 102. In one embodiment, the hook 112 may be secured at the center of the loaded member 102. In alternative embodiments, the hook 112 may be secured to the side of the loaded member 102 to which the strain sensors 104 are secured, or to the side of the loaded member 102 that is opposite that to which the strain sensors 104 are secured. The hook 112 may allow application of a force to the hook 112 where this force is to be measured by the force sensor 100. The hook 112 may be fixed to the loaded member 102 in such a manner that a moment is created in the loaded member 102 by the hook 112 and its attached load.

In the embodiment shown in FIG. 1, the force sensor 100 may be secured to a supporting surface. The hook 112 may be secured to a first major side of the loaded member 102 (along the positive Z axis 110), and the force sensor 100 may be secured to the supporting surface where the second major side of the loaded member 102 (opposite the first major side) faces the supporting surface.

A force may be applied pulling at the hook 112 or by attaching a load to the hook 112. The applied force may cause the loaded member 102 to move slightly (in micromovements), which may tense or compress, as applicable, the strain sensors 104. The detector may determine the strain measured by each strain sensor 104, and the detector may calculate the magnitude and direction of the resulting force applied to the hook 112 from the proportional strains sensed by each strain sensor 104. Thus, the force sensor 100 may be a multi-axis force sensor measuring force on at least two axes.

In each embodiment, the strain sensors 104 may be calibrated before using the force sensor 100. Calibration may include applying known test forces to the hook 112 across the entire magnitude and direction range of the force sensor 100 to obtain a calibration curve for each strain sensor 104. In one embodiment, calibration may involve applying known test forces to the hook 112 at several discrete magnitudes and directions within the range of the force sensor 100. In one embodiment, the discrete directions may include the positive X axis 106, the negative X axis 106, the positive Y axis 108, the negative Y axis 108, the positive Z axis 110, and the negative Z axis 110. In one embodiment, the discrete magnitudes may include no applied force, full rated force, and half of the rated force. Alternative embodiments may include intermediate directions and magnitudes. The calibration may result in a combination of resulting strains measured by each strain sensor 104 correlated to the known magnitude and direction of each applied test force.

The loaded member 102 may include a rim 114 along its outer circumference and perpendicular to its major sides or surfaces. In the embodiment shown in FIG. 1, the rim 114 may extend along the negative Z axis 110 below the second major side of the loaded member 102 (that is facing the supporting surface). This rim extension may result in a clearance between the second major side of the loaded member 102 and the supporting surface. The resulting clearance may allow micromovement of the loaded member 102 in the direction of the negative Z axis 110. In another embodiment, the rim 114 may also extend along the positive Z axis 110 above the first major side of the loaded member 102 (to which the hook 112 is secured).

Figure 2:
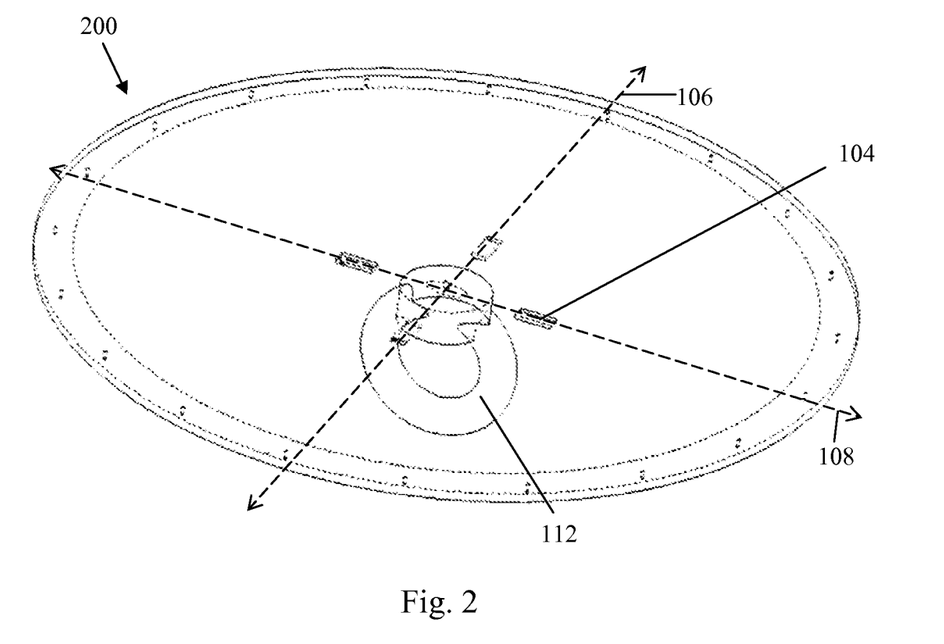
FIG. 2 is a perspective view of a force sensor according to another embodiment.

FIG. 2 shows a force sensor 200 according to another embodiment. This force sensor 200 may be similar to the force sensor 100 of FIG. 1, except that four strain sensors 104 are used instead of three. FIG. 2 shows that the four strain sensors 104 may be positioned equidistant from the center of the loaded member 102, spaced equally from each other, and oriented radially from the center of the loaded member 102.

The force sensor 200 shown in FIG. 2 may have an orientation that is opposite from that of the force sensor 100 shown in FIG. 1. The force sensor 200 may be secured to the bottom of a supporting surface such that a force is applied to the hook 112 from underneath the force sensor 200. One example may be a load that is secured to and supported by the hook 112. Each force sensor embodiment may be used in any orientation, whether supported from above, from below, or from the side such that the Z axis 110 of the force sensor is horizontal, or from any other angle in between.

In another embodiment, two strain sensors 104 may be used. The two strain sensors 104 may be oriented orthogonally to each other on the loaded member 102, equidistant from the center of the loaded member 102. In alternative embodiments, various numbers of strain sensors 104 may be used, including five, six, seven, eight, ten, twelve, sixteen, twenty four or more. Adding strain sensors 104 may increase the accuracy of the force sensor because the calculation of the resulting force applied to the force sensor may have many components from individual strain sensors 104, thus reducing the contribution of each strain sensor 104 to the overall force calculation.

Figure 3:
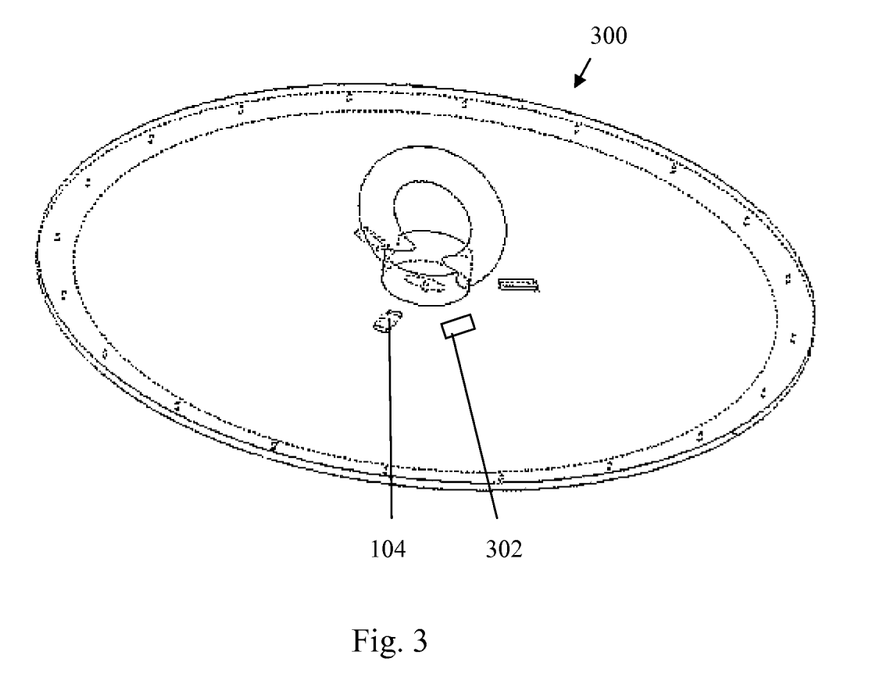
FIG. 3 is a perspective view of a force sensor according to another embodiment.

FIG. 3 shows a force sensor 300 according to another embodiment. This force sensor 300 may be similar to the force sensor 100 of FIG. 1 and may include a temperature sensor 302. The temperature sensor 302 may be secured to the loaded member 102. In alternative embodiments, the temperature sensor 302 may be secured at either major side of the loaded member 102, along the rim 114 of the loaded member, or on the hook 112. In alternative embodiments, the temperature sensor 302 may be secured near or remote from the strain sensors 104. The temperature sensor 302 may be used with any embodiment of the force sensor.

The temperature sensor 302 may be optical or electromagnetic, in alternative embodiments. The temperature sensor 302 may also be connected to the detector. The temperature sensor 302 may measure the temperature of the force sensor 300 and provide this information to the detector. As the temperature of a strain sensor 104 changes, the force curve of that strain sensor 104 may shift. Also, as the temperature of the loaded member 102 changes, the amount of movement based on an applied force may change. The detector may use the temperature measured by the temperature sensor 302 to compensate for thermal strains in the force sensor 300 or the loaded member 102. The detector may shift the force curves of the strain sensors 104 based on the temperature.

Figure 4:
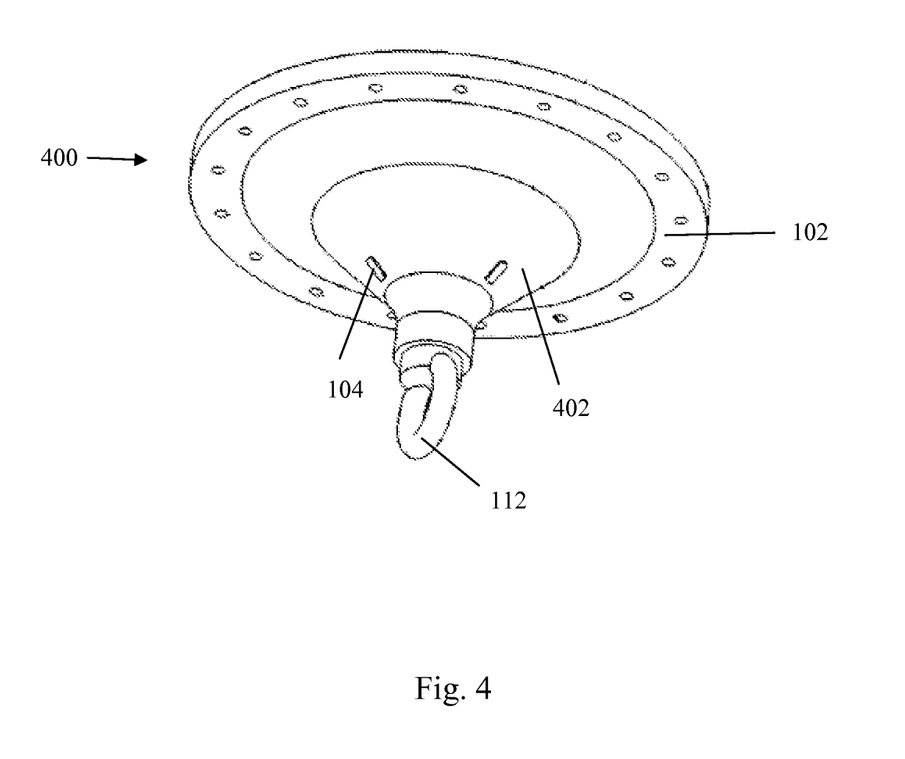
FIG. 4 is a perspective view of a force sensor according to another embodiment.

FIG. 4 shows a force sensor 400 according to another embodiment. This force sensor 400 may be similar to the force sensor 200 of FIG. 2, except that the loaded member 102 may be bowl-shaped or dish-shaped. In one embodiment, shown in FIG. 4, the loaded member 102 may include a substantially flat-shaped outer ring and a bowl-shaped inner portion 402, where the hook 112 is connected to or integrated with the inner portion 402. The flat-shaped outer ring may aid in securing the force sensor 400 to a flat supporting surface. In another embodiment, the entire loaded member 102 may be bowl-shaped with no flat-shaped outer ring. The bowl-shaped force sensor 400 may be more efficient in high-load applications. The loaded member 102 may require less material in the bowl shape than in the flat-plate shape to support the same load. With a bowl shape, the loaded member 102 may be thinner than with a flat-plate shape to support the same load, which may reduce material costs and the total weight of the loaded member 102.

In one embodiment, the strain sensors 104 may be secured on the bowl-shaped inner portion 402 (or the bowl-shaped loaded member 102 if the entire loaded member 102 is bowl-shaped). In another embodiment, the strain sensors 104 may be secured to the flat-shaped outer ring. The portion of the loaded member 102 to which the strain sensors 104 are secured may have the micromovements when a force is applied to the hook 112. In one embodiment, the strain sensors 104 may be positioned such that their centers are intersected by a center plane that is orthogonal to the Z axis 110 (similar to that shown in FIG. 6). In another embodiment, the strain sensors 104 may all be positioned at various locations along the Z axis 110.

Figure 5:
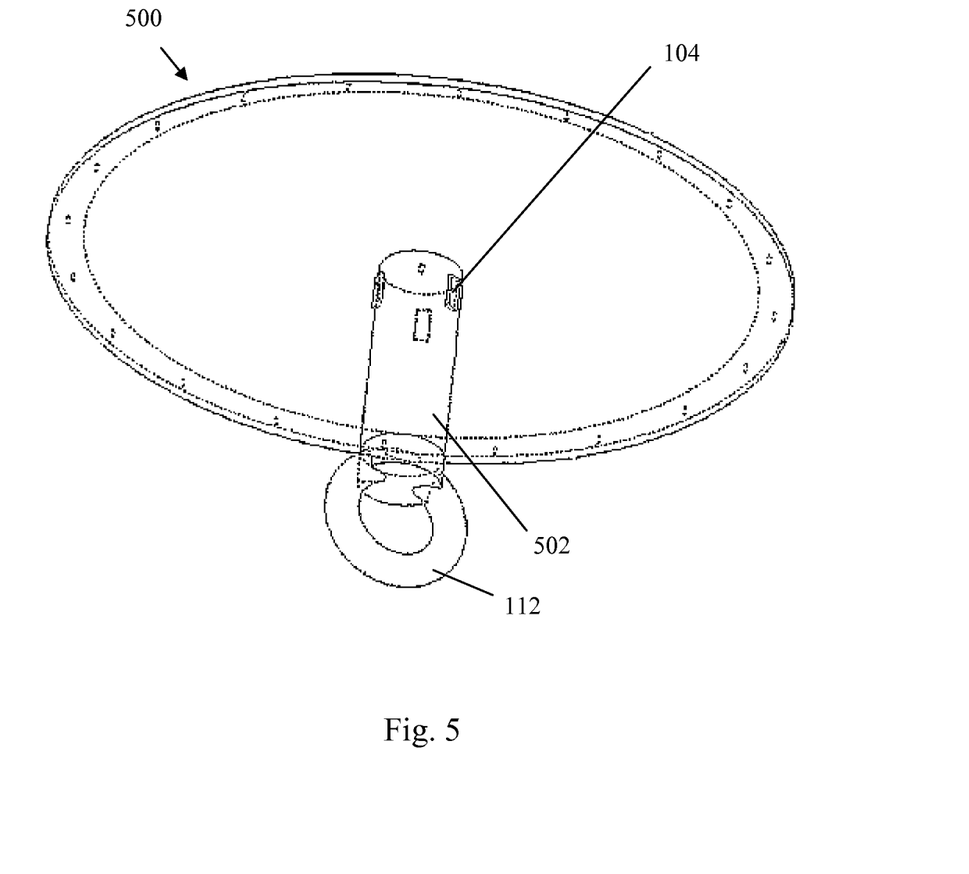
FIG. 5 is a perspective view of a force sensor according to another embodiment.

FIG. 5 shows a force sensor 500 according to another embodiment. This force sensor 500 may be similar to the force sensor 100 of FIG. 1, except that the loaded member 102 may include a column 502 on which the strain sensors 104 are secured and to which the hook 112 is secured. The column 502 may be secured to a base or flat plate of the loaded member 102. The column 502 may have micromovements when a force is applied to the hook 112. The column 502 may be of any desired dimensions. In other embodiments, a pyramid, a cube, a rectangular prism, or a cone may be used instead of a column 502. In other embodiments, the loaded member 102 may include the column 502 (or other shape) without the flat plate base. In addition to the types and shapes of loaded members 102 disclosed here, other embodiments of force sensors may use other shapes of loaded members 102.

Figure 6:
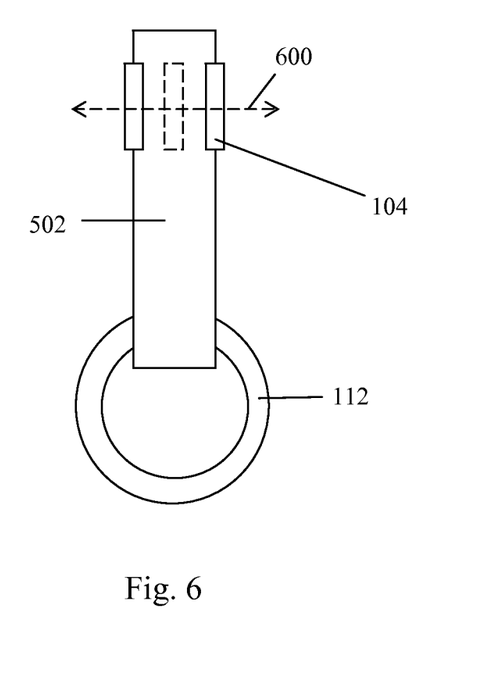
FIG. 6 is a side view of a portion of the force sensor shown in FIG. 5.

FIG. 6 shows a side view of the column 502, hook 112, and strain sensors 104 of FIG. 5. In one embodiment, the strain sensors 104 may all be oriented in parallel with each other. In another embodiment, the strain sensors may all be oriented at various angles to each other. In one embodiment, the strain sensors 104 may all be positioned such that their centers are intersected by a center plane 600 that is orthogonal to the Z axis 110. In another embodiment, the strain sensors 104 may all be positioned at various positions along the Z axis 110. In one embodiment, the strain sensors 104 may be located on the column 502 nearer to the flat plate of the loaded member 102 than to the hook 112, as shown in FIGS. 5-6. In another embodiment, the strain sensors 104 may be located on the column 502 nearer to the hook 112 than to the flat plate of the loaded member 102.

Figure 7:
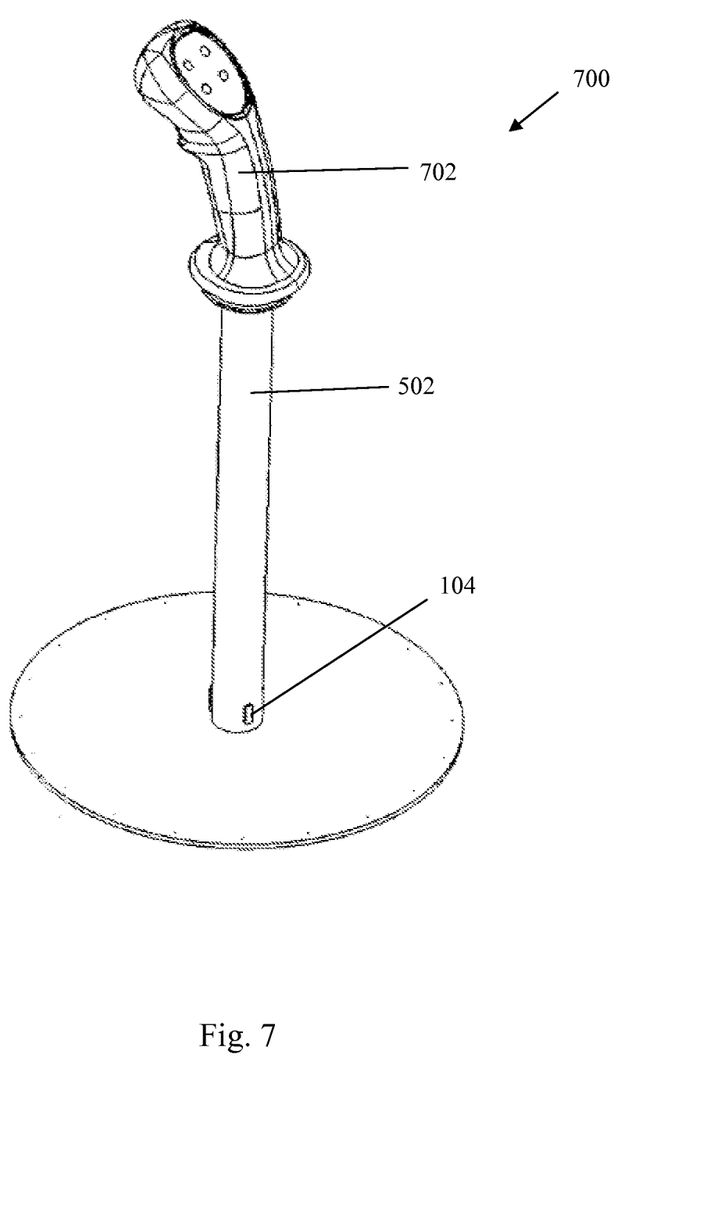
FIG. 7 is a perspective view of a controller according to one embodiment.

FIG. 7 shows a controller 700 that implements an embodiment of a force sensor. The controller 700 may be similar to the force sensor 500 of FIG. 5, except that a handle 702, instead of a hook 112, may be attached to the distal end of the column 502 of the loaded member 102. The controller 700 may be used to sense force applied to the handle 702 and the column 502. The controller 700 may be used as a user input device for other devices, computers, and machines. In alternative embodiments, the controller 700 may be used as a joystick and as a human-machine interface (HMI). The controller 700 may control other devices, computers, and machines based on a user applying force to the handle 702.

Figure 8:
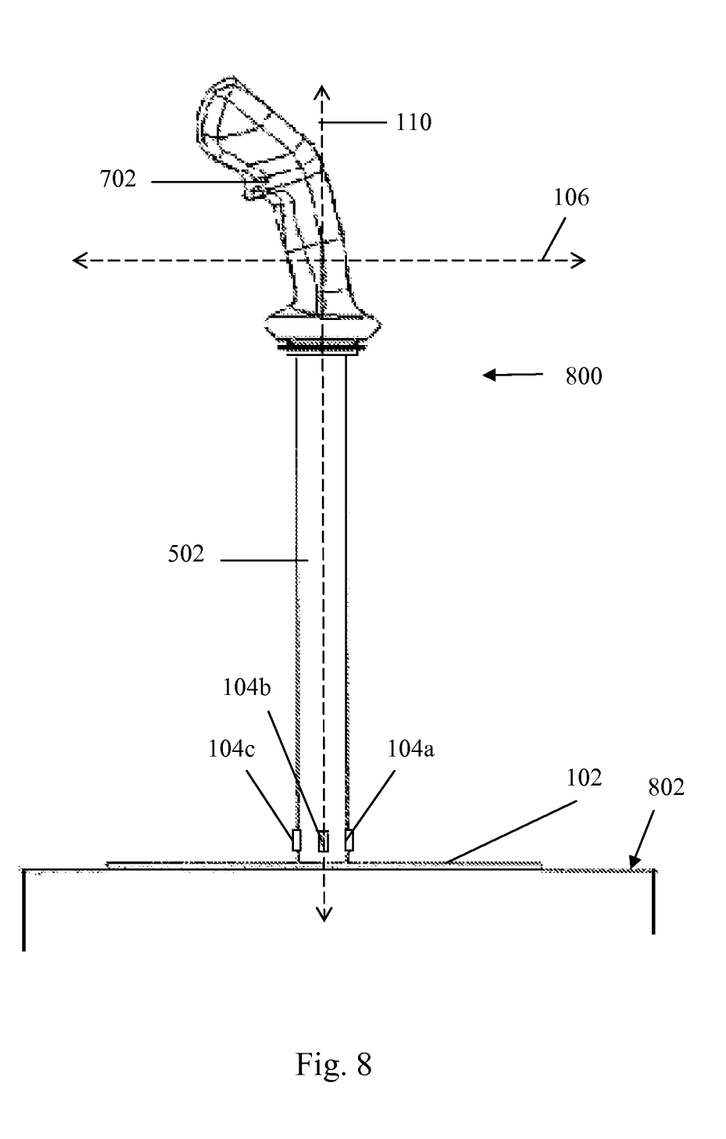
FIG. 8 is a side view of a controller according to one embodiment.

FIG. 8 shows a side view of a controller 800 that is secured to and supported by a supporting surface 802. This controller 800 may be similar to the controller 700 of FIG. 7, except that four strain sensors are secured to the column 502. The four strain sensors may be labeled 104a, 104b, 104c, and 104d (not shown) for ease of discussion. The four strain sensors 104a-d may be secured equidistant from each other around the column 502. For reference, strain sensors 104a and 104c lie along the X axis 106, and strain sensors 104b and 104d lie along the Y axis 108. All four strain sensors 104a-d may have their centers at the same location along the Z axis 110. The view of FIG. 8 is in the direction of the positive Y axis 108.

With continued reference to FIG. 8, the operation of the controller 800 will now be described. All other controller and force sensor embodiments may operate in a similar and analogous manner. When a force is applied to the handle 702 in the direction of the positive X axis 106, strain sensor 104a may be compressed and measure a compressive strain while strain sensor 104c may be tensed and measure a tensile strain. When a force is applied to the handle 702 in the direction of the negative X axis 106, strain sensor 104c may be compressed and measure a compressive strain while strain sensor 104a may be tensed and measure a tensile strain. When a force is applied to the handle 702 in the direction of the positive Y axis 108, strain sensor 104d may be compressed and measure a compressive strain while strain sensor 104b may be tensed and measure a tensile strain. When a force is applied to the handle 702 in the direction of the negative Y axis 108, strain sensor 104b may be compressed and measure a compressive strain while strain sensor 104d may be tensed and measure a tensile strain. When a force is applied to the handle 702 in the direction of the positive Z axis 110, all strain sensors 104a-d may be tensed and measure a tensile strain. When a force is applied to the handle 702 in the direction of the negative Z axis 110, all strain sensors 104a-d may be compressed and measure a compressive strain. Forces in any other direction may accordingly tense or compress the strain sensors 104a-d. For example, a force applied to the handle 702 in the direction of the positive X axis 106, positive Y axis 108, and positive Z axis 110 may tense all strain sensors 104a-d, but strain sensors 104b and 104c may be tensed more than strain sensors 104a and 104d. Thus, the applied force may be determined even if it does not lie directly on one of the axes on which the strain sensors 104a-d are aligned. The strain sensors 104a-d may be strained in proportion to the force applied to the handle 702.

As previously described, the controller 800 may be calibrated before use. Then, the resulting strains sensed by the strain sensors 104a-d may be combined by the detector to calculate the overall force (magnitude and direction) that is applied to the handle 702 of the controller 800. The overall force applied to the controller 800 may be calculated based on how much each strain sensor 104a-d is strained and the type of strain (tensile or compressive).

As long as the force applied to the controller 800 (or any other embodiment) does not significantly alter the geometry of the loaded member 102 where the strain sensors 104a-d are secured, superposition of strains may be used to determine the applied force. If the applied force exceeds the rating of the controller 800 and significantly alters the geometry of the loaded member 102, the controller 800 may be recalibrated before further use.

In another embodiment similar to that of FIG. 8, one strain sensor 104 may be secured to the column 502 and oriented along the Z axis 110, one strain sensor 104 may be secured to the loaded member 102 and oriented along the X axis 106, and one strain sensor 104 may be secured to the loaded member 102 and oriented along the Y axis 108.

Figure 9:
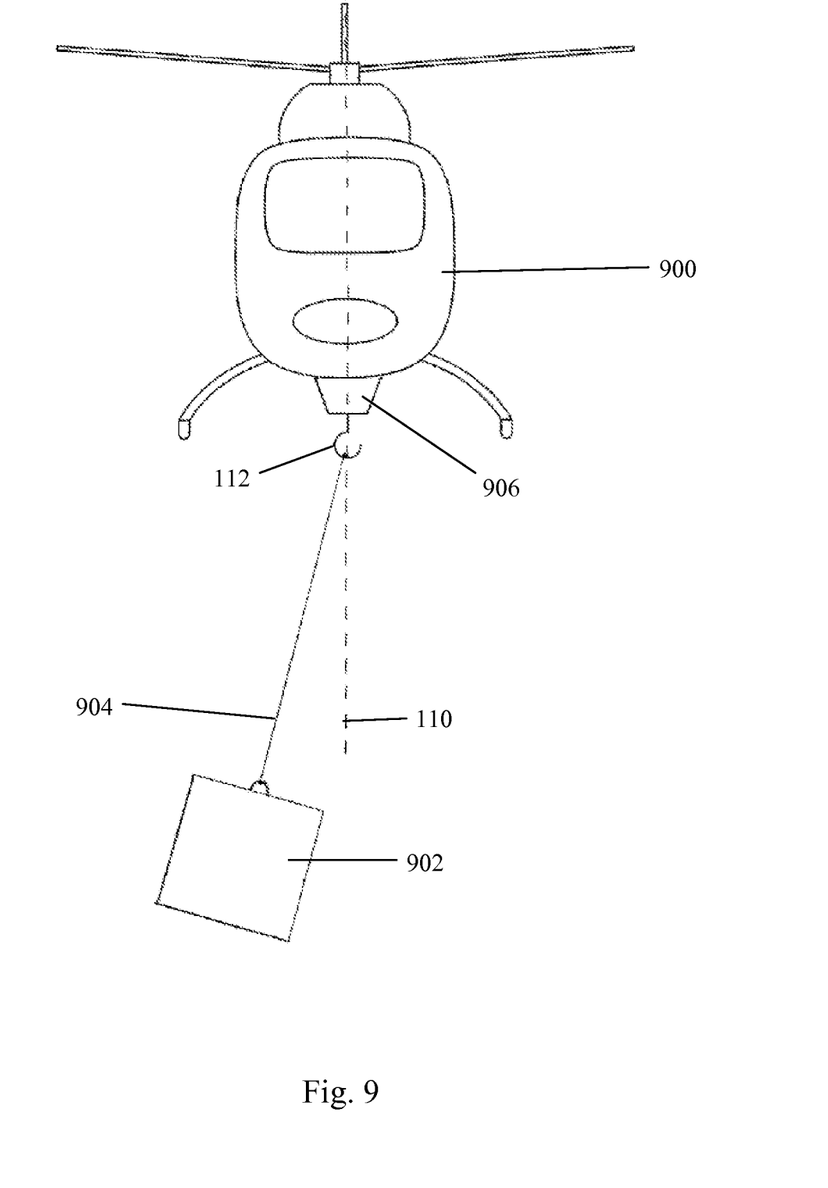
FIG. 9 is a front view of an aircraft supporting a load from a force sensor.

FIG. 9 shows an aircraft 900, which may be, but is not limited to, an airplane or a helicopter, carrying a load 902 on a sling 904, chain, or rope. One end of the sling 904 may be secured to the load 902, and the other end may be secured to a hook 112 of a force sensor 906. The force sensor 906 may be any embodiment described in this specification. The force sensor 906 may be secured to the load-bearing point of the aircraft 900.

The force sensor 900 may measure the magnitude and direction of the force applied by the load 902 to the aircraft 900, including during flight. If the slung load 902 moves to a point where the center of gravity of the aircraft 900 moves outside of the operational limits, the aircraft 900 may become unstable. Such instability may require the aircraft 900 to release the load 902 before the transport is complete (thus losing the load 902), or the aircraft 900 may be destroyed and lost.

In another embodiment, the force sensor 900 may measure the relative position of the load 902 with respect to the aircraft 900. If the magnitude and direction of the force applied by the load 902 is measured, and if the distance from the load 902 to the force sensor 900 is supplied, the position of the load 902 relative to the force sensor 900 may be calculated. The force sensor may also be used in a crane or a gantry (including an overhead gantry) or any other machine that supports loads (load-bearing machine or device) to measure the force or load supported by such machines, including the position of such a load with respect to the machine if the distance between the load and the machine is known or determined.

The force sensor may utilize no electrical components in the force sensor proper, and the signal sent to and returned from the force sensor may be a light beam rather than an electrical signal. The force sensor may be used in applications that include, but are not limited to: high-intensity EMI/RFI environments where conventional electronic equipment may be subject to interference; long runs of cable where noise or signal loss is a concern (single mode fiber may have very low loss); environments involving very high voltages, including power substations; environments involving ionizing radiation, including nuclear reactors; electromagnetically sensitive environments; environments with high magnetic fluxes, including MRI systems; and environments that require intrinsic safety, including explosion-proof and energy-limited environments.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A force sensor comprising:
a rigid loaded member comprising:
a flat plate comprising a first major side, a second major side opposite the first major side, and a center; wherein the first major side and the second major side are substantially parallel to each other and to a plane including orthogonal X and Y axes, and are substantially perpendicular to the Z axis;
at least two optical strain sensors directly secured to at least one of the first major side and the second major side; and
an attachment means secured to the first major side substantially at the center;
wherein the loaded member is configured to be securable to an associated supporting surface such that the second major side faces the associated supporting surface.

2. The force sensor of claim 1, wherein the at least two strain sensors are directly secured to the first major side.

3. The force sensor of claim 2, wherein the attachment means comprises a member selected from the group consisting of a hook, a loop, an eyelet, and a protrusion with a threaded opening.

4. The force sensor of claim 3, wherein the strain sensors are fiber Bragg grating sensors or Fabry-Perot strain sensors.

5. The force sensor of claim 3, wherein the at least two strain sensors comprise three strain sensors oriented radially from the center, spaced equally from the center, and spaced equally from each other.

6. The force sensor of claim 3, wherein the at least two strain sensors comprise four strain sensors oriented radially from the center, spaced equally from the center, and spaced equally from each other.

7. The force sensor of claim 3 further comprising a temperature sensor secured to the first major side near the strain sensors.

8. A system comprising:
the force sensor of claim 7;
an optical detector; and
optical fiber connecting the strain sensors to the detector;
wherein the temperature sensor is connected to the detector; and
wherein the detector is programmed to:
detect the strain sensed by each strain sensor;
detect the temperature sensed by the temperature sensor;
calculate a magnitude and direction of an applied force based on the detected strain from all strain sensors; and
adjust the calculated magnitude and direction of the applied force based on the sensed temperature.

9. A system comprising:
the force sensor of claim 3;
an optical detector; and
optical fiber connecting the strain sensors to the detector;
wherein the detector is programmed to detect the strain sensed by each strain sensor and to calculate a magnitude and direction of an applied force based on the detected strain from all strain sensors.

10. A method comprising the steps of:
a. providing:
a load-bearing machine;
the system of claim 9, wherein the force sensor is secured to a supporting surface of the load-bearing machine; and
a load;
b. supporting the load solely by the load-bearing machine using the attachment means; and
c. calculating the magnitude and direction of the applied force from the load using the system.

11. A force sensor comprising:
a rigid loaded member comprising:
a substantially cylindrical column comprising:
a primary axis substantially parallel to a Z axis and substantially perpendicular to a plane including orthogonal X and Y axes;
a continuous circumferential outer surface substantially parallel to the Z axis; and
two substantially parallel bases at first and second ends of the column, wherein the bases are substantially perpendicular to the Z axis; and
at least two optical strain sensors directly secured to the outer surface of the column;

wherein the loaded member is configured to be securable to an associated supporting surface such that the first end of the column faces away from the associated supporting surface; and wherein the first end of the column is configured for application of a force to the first end.

12. The force sensor of claim 11, wherein the loaded member further comprises a flat plate comprising a first major side, a second major side opposite the first major side, and a center;
   wherein the first major side and the second major side are substantially parallel to each other, and are substantially perpendicular to the Z axis; and
   wherein the second end of the column is secured to the first major side of the flat plate at substantially the center.

13. The force sensor of claim 12, wherein the loaded member further comprises a rim along an outer circumference of the flat plate and substantially perpendicular to the first major side, wherein the rim extends along the Z axis past the second major side.

14. The force sensor of claim 13, further comprising an attachment means secured to the first end of the column;
   wherein the attachment means comprises a member selected from the group consisting of a hook, a loop, an eyelet, and a protrusion with a threaded opening.

15. The force sensor of claim 13, further comprising a handle secured to the first end of the column.

16. The force sensor of claim 13, wherein the at least two strain sensors comprise three strain sensors oriented parallel to the Z axis, spaced equally from each other along the outer surface of the column, and located such that centers of the strain sensors are intersected by a plane that is substantially orthogonal to the Z axis.

17. The force sensor of claim 13, wherein the at least two strain sensors comprise four strain sensors oriented parallel to the Z axis, spaced equally from each other along the outer surface of the column, and located such that centers of the strain sensors are intersected by a plane that is substantially orthogonal to the Z axis.

18. A system comprising:
   the force sensor of claim 13;
   an optical detector; and
   optical fiber connecting the strain sensors to the detector;
   wherein the detector is programmed to detect the strain sensed by each strain sensor and to calculate a magnitude and direction of an applied force based on the detected strain from all strain sensors.

19. A method comprising the steps of:
   a. providing:
      the system of claim 18, further comprising a handle secured to the first end of the column; and
      a computer connected to the detector;
   b. applying a force to the handle;
   c. calculating the magnitude and direction of the applied force using the system; and
   d. controlling the computer based on the calculated magnitude and direction of the applied force.

20. A method comprising the steps of:
   a. providing:
      a load-bearing machine;
      the system of claim 18, further comprising an attachment means secured to the first end of the column; wherein the attachment means comprises a member selected from the group consisting of a hook, a loop, an eyelet, and a protrusion with a threaded opening; wherein the force sensor is secured to a supporting surface of the load-bearing machine; and
      a load;
   b. supporting the load solely by the load-bearing machine using the attachment means; and
   c. calculating the magnitude and direction of the applied force from the load using the system.

\* \* \* \* \*